C. J. SHUMAKER.
TIRE PROTECTOR.
APPLICATION FILED AUG. 8, 1910. RENEWED SEPT. 3, 1912.
1,042,157.
Patented Oct. 22, 1912.
2 SHEETS—SHEET 1.
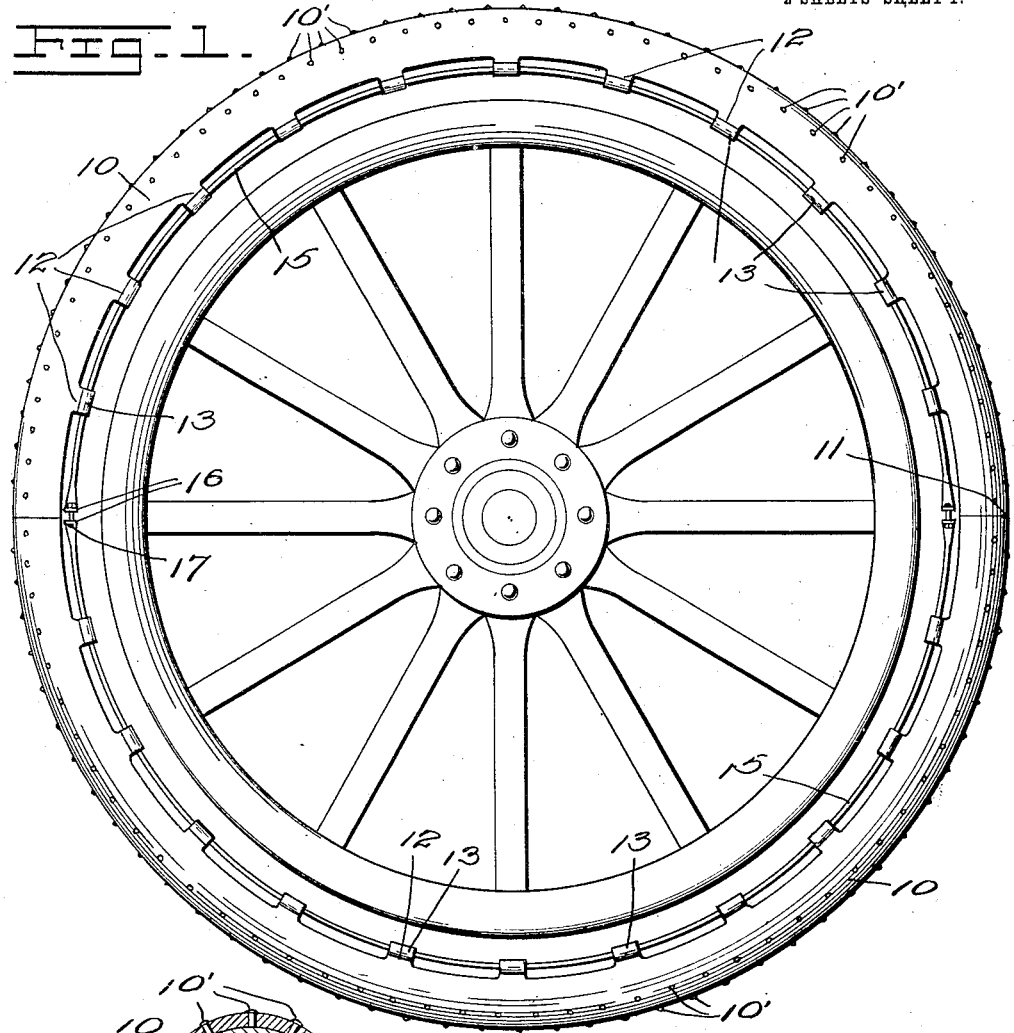
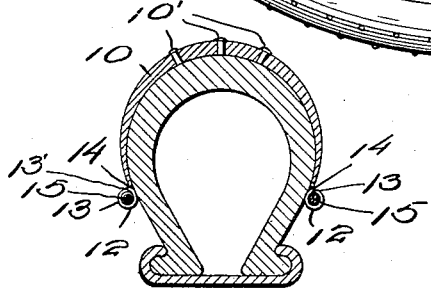
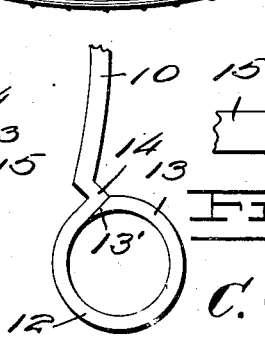
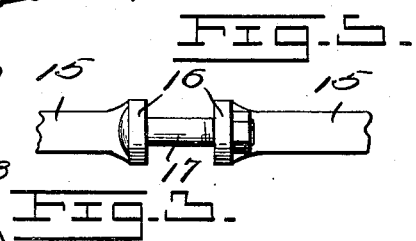

C. J. SHUMAKER.
TIRE PROTECTOR.
APPLICATION FILED AUG. 8, 1910. RENEWED SEPT. 3, 1912.
1,042,157.
Patented Oct. 22, 1912.
2 SHEETS—SHEET 2.
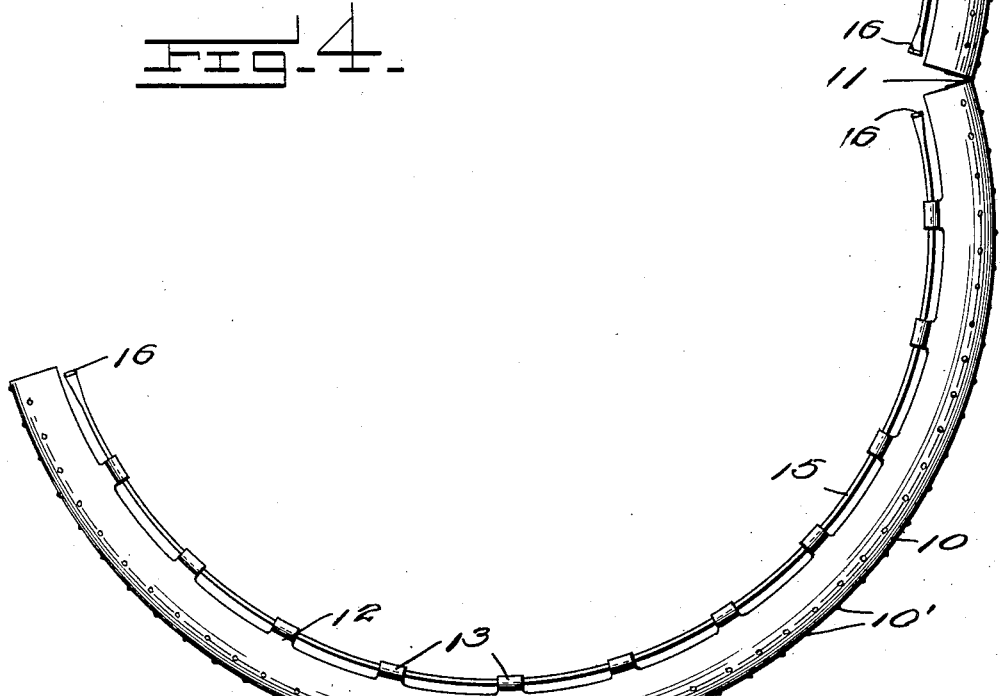

UNITED STATES PATENT OFFICE.

CHARLES JOSEPH SHUMAKER, OF TUPELO, MISSISSIPPI.

TIRE-PROTECTOR.

1,042,157.  Specification of Letters Patent.  Patented Oct. 22, 1912.

Application filed August 8, 1910, Serial No. 576,100. Renewed September 3, 1912. Serial No. 718,788.

*To all whom it may concern:*

Be it known that I, CHARLES JOSEPH SHUMAKER, a citizen of the United States, residing at Tupelo, in the county of Lee and State of Mississippi, have invented certain new and useful Improvements in Tire-Protectors, of which the following is a specification.

This invention relates to an improvement in tire protectors.

The primary object of the invention is to provide a device of this character which will perform the double function of preventing punctures and preventing the wheel upon which the tire is attached, from slipping, the construction being such as to permit the protector to be readily attached and removed.

In the drawings: Figure 1 is a view showing the device in position on a tire, Fig. 2 a detail view showing the attaching means, Fig. 3 an end view of one of the securing ears, Fig. 4 a view showing the device removed from the tire, and, Fig. 5 a detail view showing the tightening member.

In the drawings: 10 designates a pair of concaved members hingedly connected at the point 11, said members being adapted to conform in shape to the periphery of a vehicle tire. Arranged on either side of said members are a plurality of ears 12 which terminate in the curved extensions 13, the ears being provided with the struck up portions 14 which lie adjacent the end portions of the curved extensions, said end portions being provided with the beveled surfaces 13'. It will be noted that the tread portion of the members 10 is of greater thickness than the ears, while the curved bends of the ears give said ears a certain amount of resiliency. The tread portion is provided with the studs 10' which form anti-slipping devices.

In applying the device to a tire, the members are opened as shown in Fig. 4, one section being adapted to incase one half of the tire, the other section incasing the other half. With the sections in this position, clamping rings 15 are inserted beneath the curved spring members 13, the rib 14 preventing the accidental displacement of said rings. The meeting end portions of the rings 15 are flattened, and terminate in offsets 16, through which pass tightening bolts 17. It will thus be seen that when the rings are in position the members 10 will have their free ends securely locked together, the members themselves being held in engagement with the tread of the vehicle tire. In order to tighten the members, the bolts 17 are rotated, which will draw the ears toward the center of the wheel. Particular attention is called to the manner in which the ears are curved to engage their body portions, the engagement being such as to permit the retaining ring to be quickly inserted and removed, and yet, at the same time prevent said ring from accidentally slipping from beneath the curved end portions of the ears.

It will be noted that a construction of this sort will effectually protect the tire from puncture, as well as form an efficient anti-skidding device. It will also be noted that such a device can be easily, as well as cheaply manufactured all of the parts being readily and conveniently assembled.

What is claimed is:

A tire protector comprising strips of metal of size and configuration to fit partially around a tire tread, each strip having integral ears formed with an outwardly projecting V-portion and terminating below the V in a rounded portion providing an eye, said eye having its end beveled to fit against the lower side of the V, and a securing ring adapted to be engaged in the eye by springing the V and beveled end of the eye apart.

In testimony whereof I affix my signature, in the presence of two witnesses.

CHARLES JOSEPH SHUMAKER.

Witnesses:
W. W. TRICE,
C. R. STRAIN.

Copies of this patent may be obtained for five cents each, by addressing the "Commissioner of Patents, Washington, D. C."